US008418234B2

(12) United States Patent
Hinton et al.

(10) Patent No.: US 8,418,234 B2
(45) Date of Patent: Apr. 9, 2013

(54) AUTHENTICATION OF A PRINCIPAL IN A FEDERATION

(75) Inventors: Heather M. Hinton, Austin, TX (US); Anthony S. Moran, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 11/304,945

(22) Filed: Dec. 15, 2005

(65) Prior Publication Data

US 2007/0143829 A1 Jun. 21, 2007

(51) Int. Cl.
*G06F 7/04* (2006.01)
(52) U.S. Cl.
USPC ............... 726/5; 713/168; 713/170; 713/182; 726/9
(58) Field of Classification Search ........................ None
See application file for complete search history.

(56) References Cited

U.S. PATENT DOCUMENTS

| | | | |
|---|---|---|---|
| 5,604,490 A | 2/1997 | Blakley, III et al. | |
| 5,774,551 A | 6/1998 | Wu et al. | |
| 6,668,327 B1 | 12/2003 | Prabandham et al. | |
| 6,754,829 B1 | 6/2004 | Butt et al. | |
| 6,810,480 B1 | 10/2004 | Parker et al. | |
| 6,892,307 B1 | 5/2005 | Wood et al. | |
| 6,957,338 B1 | 10/2005 | Sumino | |
| 7,296,290 B2 * | 11/2007 | Barriga et al. | 726/8 |
| 7,444,414 B2 * | 10/2008 | Foster et al. | 709/229 |
| 7,487,531 B1 * | 2/2009 | Vogel et al. | 725/93 |
| 7,739,744 B2 * | 6/2010 | Burch et al. | 726/26 |
| 7,788,729 B2 * | 8/2010 | Cameron et al. | 726/30 |
| 2002/0065912 A1 * | 5/2002 | Catchpole et al. | 709/224 |
| 2003/0149781 A1 | 8/2003 | Yared et al. | |
| 2004/0073629 A1 | 4/2004 | Bazot et al. | |
| 2005/0076248 A1 * | 4/2005 | Cahill et al. | 713/202 |
| 2005/0278547 A1 * | 12/2005 | Hyndman et al. | 713/185 |
| 2006/0155993 A1 * | 7/2006 | Busboon | 713/169 |
| 2008/0016232 A1 * | 1/2008 | Yared et al. | 709/229 |
| 2008/0028018 A1 * | 1/2008 | Contractor | 709/202 |

FOREIGN PATENT DOCUMENTS

WO WO2004004273 1/2004

OTHER PUBLICATIONS

OASIS, Security Assertion Markup Language (SAML) V2.0 Technical Overview, working Draft 08, Sep. 12, 2005.
"Handbook on attribution certification" first edition, JIPDEC Electronic Commerce Promotion Center, Feb. 8, 2005, vol. 1, p. 43-60.
Gudgin, Martin, (Online), WS-SX Specifications, Microsoft Corp. Dec. 7, 2005, p. 1-94, URL, http://www.oasis-open.org/committees/document.php?document_id=15831&wg_abbrev=ws-sx.

* cited by examiner

*Primary Examiner* — Fikremariam A Yalew
(74) *Attorney, Agent, or Firm* — Jeffrey S. LaBaw; David H. Judson

(57) ABSTRACT

Methods, systems, and computer program products are disclosed that give entities flexibility to implement custom authentication methods of other entities for authentication of a principal in a federation by authenticating the principal by an identity provider according to a service provider's authentication policy and recording in session data of the identity provider an authentication credential satisfying the service provider's authentication policy. Authentication of a principal in a federation is also carried out by authenticating the principal by the identity provider according to an identity provider's authentication policy. Authentication of a principal in a federation is further carried out by receiving in the identity provider an authentication request from the service provider, the authentication request specifying the service provider's authentication policy.

12 Claims, 8 Drawing Sheets

AUTHENTICATION OF A PRINCIPAL IN A FEDERATION

BACKGROUND OF THE INVENTION

1. Field of the Invention

The field of the invention is data processing, or, more specifically, methods, systems, and products for authentication of a principal in a federation.

2. Description of Related Art

A federation is a collection of administered security spaces. A federation may implement single sign-on functionality in which an access manager in one federated security space relies on an access manager in another security space for authentication services. The authentication process of federated access managers currently is limited to off-the-shelf authentication methods and custom authentication methods known to or installed upon a particular access manager. A change in authorization requirements for a principal during a single sign-on session, such as, for example, a step-up requirement, may readily be accomplished with off-the-shelf authentication methods because an access manager typically knows how to utilize the off-the-shelf authentication methods. Support for multiple custom methods of other security domains within a federated environment however is not easily accomplished because an access manager in the current art is not equipped to carry out authentication according to custom requirements of entities in another security space or domain. Approaches by current access managers are not flexible enough to implement custom authentication methods of other entities involved in the authentication process.

SUMMARY OF THE INVENTION

Methods, systems, and computer program products are disclosed that provide additional flexibility for authentication of a principal in a federation by authenticating the principal by an identity provider according to a service provider's authentication policy and recording in session data of the identity provider an authentication credential satisfying the service provider's authentication policy. Authentication of a principal in a federation is also carried out by authenticating the principal by the identity provider according to an identity provider's authentication policy. Authentication of a principal in a federation is further carried out by receiving in the identity provider an authentication request from the service provider, the authentication request specifying the service provider's authentication policy.

Authentication of a principal in a federation is still further carried out by receiving in the service provider a request of the principal for access to a resource of the service provider, determining by the service provider that an authentication credential of the request does not satisfy the service provider's authentication policy, and sending by the service provider to the identity provider an authentication request specifying the service provider's authentication policy. Authentication of a principal in a federation is also carried out by receiving an authentication response by the service provider from the identity provider, the authentication response including the authentication credential satisfying the service provider's authentication policy and recording in session data of the service provider the authentication credential.

Authentication of a principal in a federation includes authenticating the principal by an access manager of the identity provider. Authentication of a principal in a federation also includes authenticating the principal by an authentication proxy of the identity provider.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
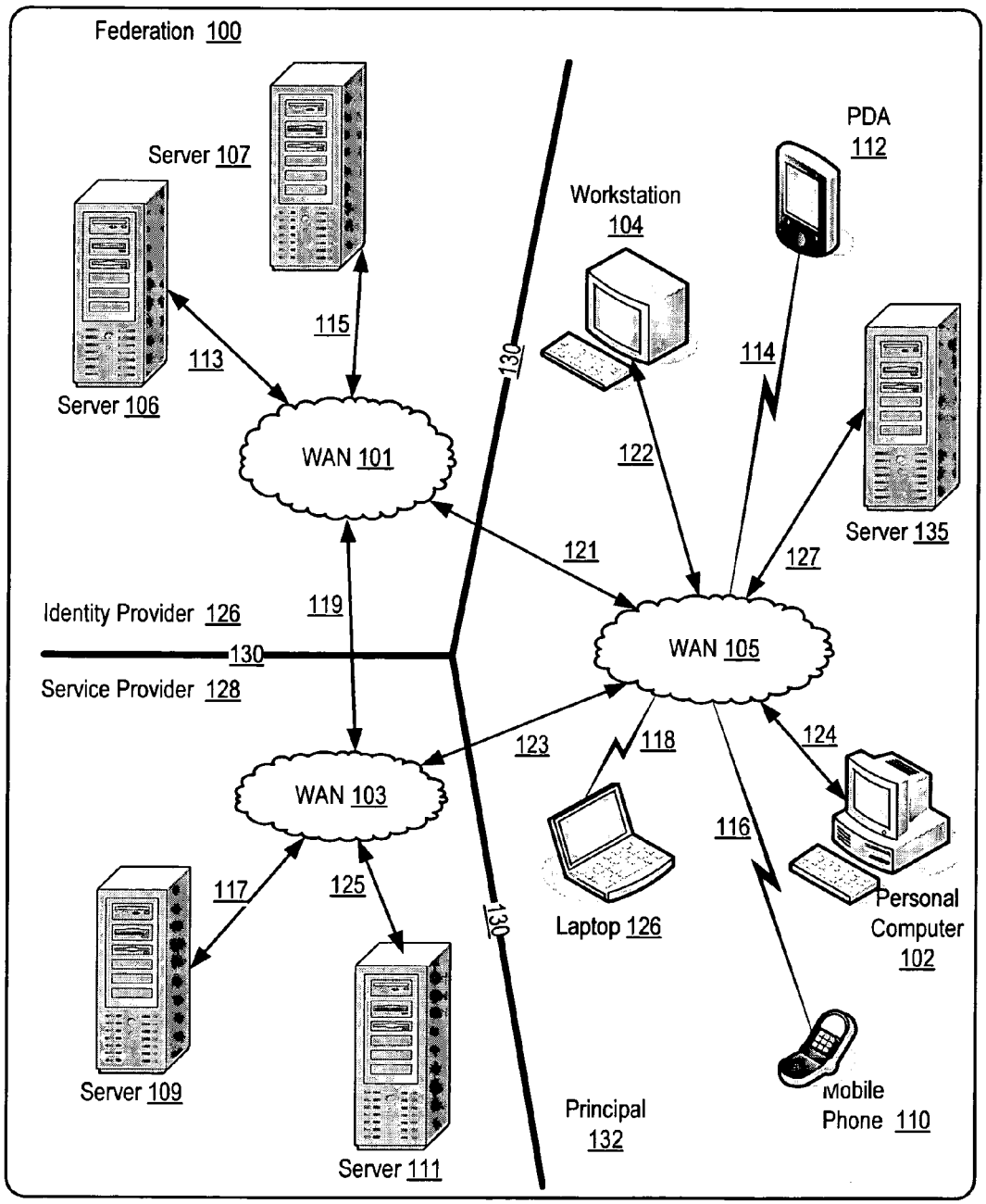
FIG. 1 sets forth a network diagram illustrating an exemplary system for authentication of a principal in a federation according to embodiments of the present invention.

Exemplary methods, systems, and products for authentication of a principal in a federation according to embodiments of the present invention are described with reference to the accompanying drawings, beginning with FIG. 1. FIG. 1 sets forth a network diagram illustrating an exemplary system for authentication of a principal in a federation according to embodiments of the present invention. The system of FIG. 1 operates generally to authenticate a principal in a federation according to embodiments of the present invention by authenticating a principal by an identity provider according to a service provider's authentication policy and recording in session data of the identity provider an authentication credential satisfying the service provider's authentication policy.

A federation is a collection of administered security spaces in which a source and a target of a resource request can determine and agree whether particular sets of security information from a source satisfy a relevant security policy of a target. In the example of FIG. 1, an administered security space of federation (100) is divided by logical boundary (130) into principal (132), identity provider (126), and service provider (128), each capable of being a source or a target of a request. Whether a target's security policy is satisfied by the source's security information may be determined by an entity other than the source or target of a resource request. For example with regard to FIG. 1, a source of a resource request may be principal (132), a target of the request may be service provider (128), and identity provider (126) may determine whether service provider's security policy is satisfied by the principal's security information.

A principal is any entity that can be granted security rights or that makes assertions about security or identity. A principal may be, for example, a person that provides a username and password through a web browser to access banking services on a web server. Entities capable of acting as principals are not restricted to people. Entities capable of acting as principals may also be other entities such as, for example, a web service client that provides an X.509 certificate to access a resource on another web service. In the example of FIG. 1, principal (132) makes assertions about security or identity for authentication by identity provider (126).

Authentication is a process of validating an identity asserted by an entity requesting access to a protected resource. Validation of an entity's identity occurs by verifying security information provided by the entity. Security information is the information provided by an entity that distinguishes the identity of an entity providing security information from the identity of other entities. Security information may include, for example, a name, a social security number, a username and password, a Kerberos ticket, an X.509 certificate, and so on. In the example of FIG. 1, identity provider (126) validates the identity of principal (132) by verifying security information provided by principal (132) when attempting to access a resource on service provider (128) or identity provider (126).

Security information of an entity may be used to create authentication credentials for an entity. An authentication credential represents the security privileges of an entity in a security space of a federation. Authentication credentials describe an entity for a specific session and are valid for the lifetime of that session. Authentication credentials may include, for example, an entity name, any group memberships, the type of security information used to authenticate a principal, and any other security attributes.

A service provider is an entity that provides a principal access to a resource. Service provider (128) of FIG. 1 is capable of receiving a request of a principal for access to a resource of a service provider, determining that an authentication credential of the request does not satisfy the service provider's authentication policy, sending to an identity provider an authentication request specifying a service provider's authentication policy, receiving an authentication response from an identity provider that includes the authentication credential satisfying a service provider's authentication policy, and recording in session data of the service provider the authentication credential. A service provider may, for example, be an investment company providing access to retirement account information, an airline providing flight and ticketing data, a university providing curriculum information, or any other service provider as will occur to those of skill in the art.

An identity provider is an entity that maintains a principal's identity information and verifies security information provided by a principal to a service provider in a single sign-on environment. Identity provider (126) of FIG. 1 is capable of authenticating a principal according to an identity provider's authentication policy, receiving an authentication request from service provider (128) that specifies a service provider's authentication policy in a single sign-on environment, authenticating a principal according to a service provider's authentication policy, and recording in session data of an identity provider an authentication credential satisfying the service provider's authentication policy. Identity provider (126) may, for example, be an employer, a university, a business entity, or a government agency, or any other identity provider as will occur to those of skill in the art.

Single sign-on is an authentication sequence that removes the burden of repeating actions that are placed on a principal. Single sign-on allows an identity provider, having authenticated a principal based on security information, to present authentication credentials of a principal to a service provider as proof of authentication. A service provider uses authentication credentials supplied by an identity provider to authenticate a principal and build a locally valid session for a principal without having to prompt a principal for previously supplied security information. Consider, for example, an employee acting as a principal, an employer serving as an identity provider, and an investment company acting as a service provider, where an employee attempts to access a 401K at the investment company through the employer's website, and where the employer's website has authenticated the employee through a username and a password. In a non-single sign-on environment, the employee must authenticate twice. The employee first authenticates when accessing the employer's website by providing a username and password. The second authentication occurs when the investment company requires the employee to again enter the username and password before the investment company authorizes the employee to access the employee's 401K. In a single sign-on environment, however, the employee only authenticates once by providing a username and password to the employer because the investment company may authorize the employee to access the 401K based on the employee's initial authentication with the employer. The employee might be required to provide additional security information if the investment company requires a method of authentication other than providing a username and password such as, for example, a Kerberos ticket or an X.509 certificate. The employee however would not be required to again provide the employee's username and password in a single sign-on environment.

The system of FIG. 1 includes a wide area network ("WAN") (101), a WAN (103), and a WAN (105) that interconnect through network connections (119, 121, and 123). The network connection aspect of the architecture of FIG. 1 is only for explanation, not for limitation. In fact, systems for authentication of a principal in a federation may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, servers (106, 107, 109, 111, and 135) implement a gateway, router, or bridge between WANs (101, 103, and 105). In the example of FIG. 1, several exemplary devices including a server (106) and a server (107) are connected to the WAN (101). Server (106) connects to the network (101) through a wireline connection (113), and server (107) connects to the network (101) through a wireline connection (115).

In the example of FIG. 1, several exemplary devices including a server (109) and a server (111) are connected to the WAN (103). Server (109) connects to the network (103) through a wireline connection (117), and server (111) connects to the network (103) through a wireline connection (125).

In the example of FIG. 1, several exemplary devices including a server (135), computer workstation (104), a PDA (112), a laptop (126), a network-enabled mobile phone (110), and a personal computer (102) are connected to the WAN (105). Server (135) connects to the network (105) through wireline connection (127), computer workstation (104) connects to the network (105) through a wireline connection (122), PDA (112) connects to the network (105) through a wireless link (114), network-enabled mobile phone (110) connects to the network (105) through a wireless link (116), laptop (126) connects to the network (105) through a wireless link (118), and personal computer (102) connects to network (105) through wireline connection (124).

In the system of FIG. 1, each of the exemplary devices (106, 107, 112, 104, 109, 111, 110, 126, 102, 135) includes a computer processor and computer memory coupled for data transfer to the processor. The computer memory of each of the computers (106 and 107) of identity provider (126) of FIG. 1 and the computer memory of each of the computer (109 and 111) of service provider (128) of FIG. 1 has disposed within it computer program instructions comprising an authentication proxy. The authentication proxy is capable generally of authentication of a principal in a federation by authenticating the principal by an identity provider according to a service provider's authentication policy and recording in session data of the identity provider an authentication credential satisfying the service provider's authentication policy.

The authentication proxy is also capable generally of authentication of a principal in a federation by authenticating the principal by the identity provider according to an identity provider's authentication policy. The authentication proxy is also capable generally of receiving in the identity provider an authentication request from the service provider, the authentication request specifying the service provider's authentication policy. The authentication proxy is also capable generally of receiving in the service provider a request of the principal for access to a resource of the service provider, determining by the service provider that an authentication credential of the request does not satisfy the service provider's authentication policy, and sending by the service provider to the identity provider an authentication request specifying the service provider's authentication policy. The authentication proxy is also capable generally of receiving an authentication response by the service provider from the identity provider, the authentication response including the authentication credential satisfying the service provider's authentication policy and recording in session data of the service provider the authentication credential.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
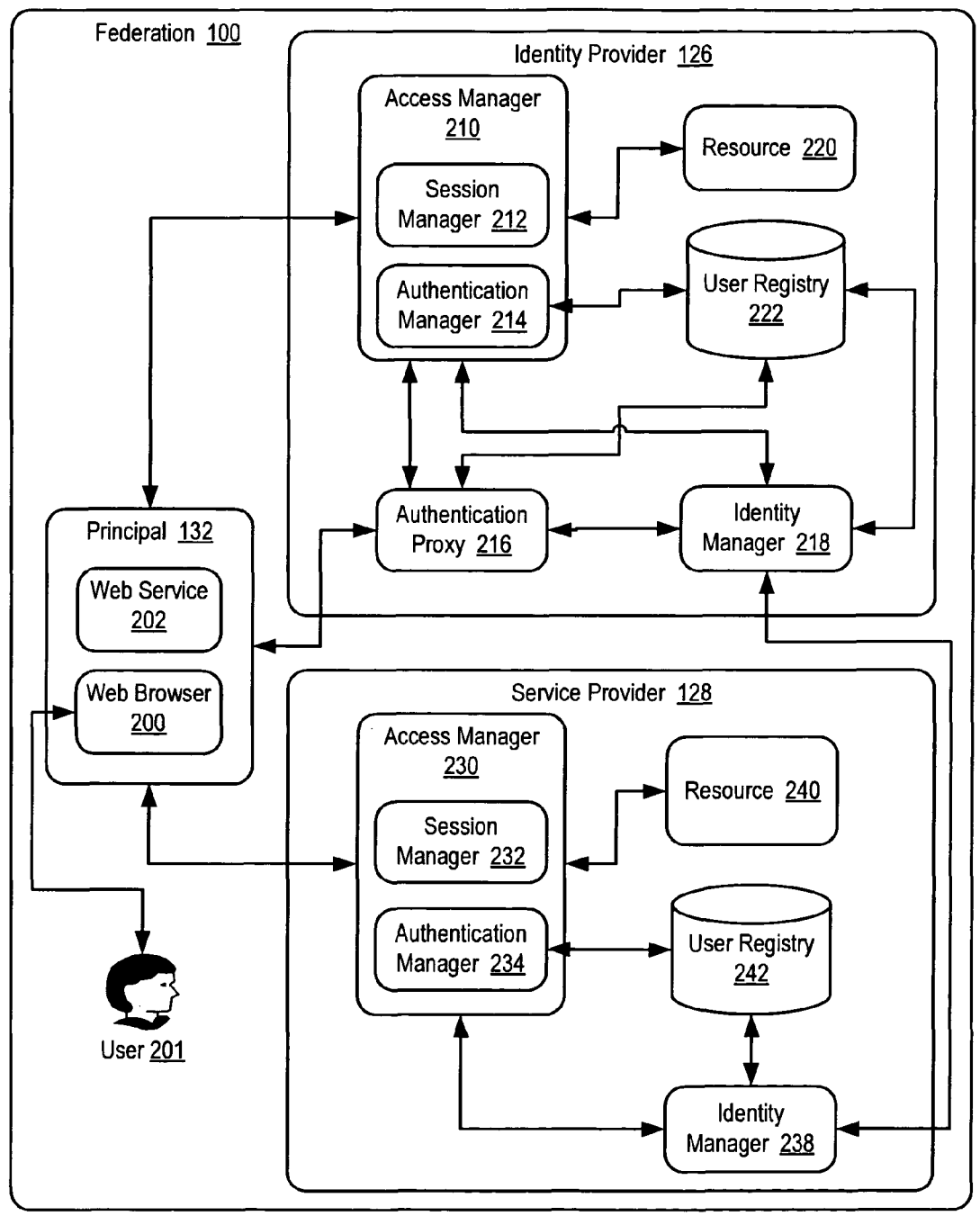
FIG. 2 sets forth a block diagram of an exemplary system for authentication of a principal in a federation according to embodiments of the present invention.

For further explanation, FIG. 2 sets forth a block diagram of an exemplary system for authentication of a principal in a federation according to embodiments of the present invention. Federation (100) of FIG. 2 includes principal (132), identity provider (126), and service provider (128). Federation (100) of FIG. 2 implements a single sign-on environment.

In the example of FIG. 2, principal (132) may be represented by person (201) operating web browser (200). A web browser is a software application that displays documents hosted by web servers or held in a file system and formatted in, for example, the Hyper-Text Markup Language ('HTML') or the Handheld Device Markup Language ('HDML'). Web browser (200) of FIG. 2 is capable of supporting redirects and automatic forwarding of requests and communicates with identity provider (126) or service provider (128) using a communications protocol such as, for example, the Hyper-Text Transfer Protocol ('HTTP') or the Wireless Application Protocol ('WAP'). Web browsers useful in authentication of a principal in a federation according to embodiments of the present invention include, for example, Microsoft Internet Explorer, Mozilla Firefox, Opera, Netscape Navigator, Safari, and any other web browser as will occur to those of skill in the art.

Principal (132) of FIG. 2 may also be represented by web service (202). A web service is a software application that supports interoperable machine-to-machine interaction over a network. Web service (202) has a public interface that is described in a machine-processable format such as, for example, Web Services Description Language ('WSDL'). A WSDL description of a web service specifies the message format and communications methods for interacting with the web service. The most common message format for interacting with a web service is SOAP, which is based on the eXtensible Markup Language ('XML'), while HTTP is the most common communication method. Other message formats for interacting with a web service include the Java Application Programming Interface for XML-based Remote Procedure Calls ('JAX-RPC'), XML-Remote Procedure Calls ('XML-RPC'), or any other messaging format as will occur to those of skill in the art. Other communication methods for interacting with a web service include the File Transfer Protocol ('FTP'), Simple Mail Transfer Protocol ('SMTP'), eXtensible Messaging and Presence Protocol ('XMPP'), and any other communication method as will occur to those of skill in the art.

A web service communicates with other webs services by using web service messages. A web service message is a self-contained unit of data exchanged between web services that conforms to a message format specified in a WSDL description. Web service messages typically include XML and other web-related content such as, for example, Multipurpose Internet Mail Extensions ('MIME') parts enclosed in a SOAP envelope.

In the example of FIG. 2, identity provider (126) includes computer resource (220) and service provider (128) includes computer resource (240). Computer resources (220 and 240) are any aggregation of information, any computer system for accessing such aggregations of information, or any program, process, or thread of execution that provides data processing services or calculations on such a system. The most common kind of computer resource is a file, but such resources may also include dynamically-generated query results as well, such as the output of CGI ('Common Gateway Interface') scripts, Java servlets, dynamic server pages, Active Server Pages, Java Server Pages, documents available in several languages, and so on. In effect, such resources are somewhat similar to files, but more general in nature. Computer resources (220 and 240) represented by files include static web pages, graphic image files, video clip files, audio clip files, and so on. Computer resources (220 and 240) represented by computer systems include any component of computers or networks such as disk drives, printers, displays, memory, computer processors, or any other components as will occur to those of skill in the art. Computer resources (220 and 240) represented by programs, processes, or threads of execution include web services.

Identity provider (126) in the example of FIG. 2 includes access manager (210). Access manager (210) is a web service that controls access to computer resource (220) and single sign-on services of identity manager (218) by providing authentication services, session management services, and authorization services to principal (132) requesting access to resource (220) or single sign-on services of identity provider (126). Access manager (210) authenticates a principal based on security information provided by the principal and creates authentication credentials for the principal's session with the access manager (210). Access manager (210) authorizes a principal to access resource (220) of identity provider (126) or to participate in single sign-on with identity manager (218) based on authentication credentials of the principal's session. An example of an access manager that may be improved for authentication of a principal in a federation according to embodiments of the present invention is the IBM® Tivoli® Access Manager. Other access managers (210) as will occur to those of skill in the art also may be improved for authentication of a principal in a federation according to the present invention.

In the example of FIG. 2, access manager (210) includes session manager (212). Session manager (212) may be represented by a web service that manages session data by performing tasks such as session creation, session destruction, activity timeouts, updating session data, and so on. A session is a lasting connection between software applications involving an exchange of data between each application during the establishment, maintenance, and release of the connection. A session may contain connection information describing the session such as, for example, a session identifier, session participants, a session key, authentication credentials, authorization privileges, and so on. Sessions may be maintained using a structure defined in the data being exchanged. For example, an HTTP exchange between web browser (200) and access manager (210) may include an HTTP cookie that stores, for example, a unique session identifier that identifies session data such as, for example, the principal's preferences or authentication credentials to access manager (210). In the example of FIG. 2, a session is represented by a data structure created and stored for its duration in the identity provider (126). In the example of FIG. 2, the session manager (212) manages session data of a session between principal (132) and identity provider (126).

An access manager (210) of FIG. 2 also includes authentication manager (214). Authentication manager (214) may be represented by a web service that authenticates principal (132) according to an identity provider's authentication policy when principal (132) accesses resource (220) of the identity provider (126) or when principal (132) participates in the single sign-on services of identity manager (218). The authentication manager (214) compares security information provided by a principal with identity-related information stored in user registry (222) and records authentication credentials in the principal's session data through session manager (212). Authentication manager (210) of FIG. 2 may require different types of authentication depending on which principal requests a resource, a type of resource (220) requested, or an authentication policy of a service provider participating in single sign-on. For example, authentication manager (214) may require a username and password for authentication when principal (132) accesses resource such as email or may require an X.509 certificate when principal (132) accesses a service provider for investment banking services in a single sign-on environment.

Identity provider (126) of FIG. 2 includes user registry (222). User registry (222) is a database that stores identity-related information of principal (132) that may include, for example, a principal identifier, a principal name, email address, physical mailing address, office location, system preferences, security groups to which a principal belongs, security privileges, a principal's asymmetric public cryptographic key, a principal's symmetric cryptographic key, other identity-related information, and so on. In the example of FIG. 2, user registry (222) of identity provider (126) is accessible by authentication manager (214), authentication proxy (216), and identity manager (218). In the example of FIG. 2, an authentication manager, an authentication proxy, or an identity manager may access user registry (222) using a directory access protocol such as, for example, the Lightweight Directory Access Protocol ('LDAP').

Identity provider (126) of FIG. 2 also includes identity manager (218). The identity manager (218) may be represented by a web service that performs single sign-on services for a principal authorized to participate in single sign-on by access manager (210) or authentication proxy (216). The identity manager (218) may implement single sign-on services in identity provider (126) by exchanging web service messages with service provider (128) and principal (132). In the example of FIG. 2, identity manager (218) receives an authentication request specifying a service provider's authentication policy from service provider (128) requesting single sign-on authentication of principal (132). Identity manager (218) of FIG. 2 creates an authentication response that includes the authentication credentials of the principal's session with the identity provider (126) for service provider (128) requesting single sign-on authentication of principal (132). Identity manager (218) may access authentication credentials of a principal's current session with an identity provider by exchanging a web service message with access manager (210). In addition, identity manager (218) obtains other identity-related information of a principal from user registry (222). An example of an identity manager that may be improved for authentication of a principal in a federation according to embodiments of the present invention is the IBM® Tivoli® Identity Manager. Other identity managers (218) as will occur to those of skill in the art also may be improved for authentication of a principal in a federation according to the present invention.

In the example of FIG. 2, identity provider (126) includes authentication proxy (216). The authentication proxy (216) may be represented by a web service that authenticates an identity of principal (132) to identity manager (218) according to a service provider's authentication policy and records in session data of an identity provider (126) an authentication credential satisfying the service provider's authentication policy. Authentication proxy (216) determines whether authentication credentials of a principal's current session with identity provider (126) satisfy a service provider's authentication policy by accessing the principal's session data through access manager (210). If the service provider's authentication policy is satisfied, authentication proxy (216) notifies identity manager (218) through a web service message. If the service provider's authentication policy is not satisfied by the authentication credentials of a principal's current session with identity provider (126), authentication proxy (216) prompts the principal to provide additional security information for the session, verifies the additional security information using identity-related information of the principal stored in user registry (222), records the additional authentication credentials satisfying the service provider's authentication policy in the principal's session data through the access manager (210), and notifies the identity manager (218) through a web services message that the service provider's authentication policy is satisfied. Authentication proxy (216) of FIG. 2 is implemented separately from access manager (210) in the example of FIG. 2. Implementing authentication proxy (216) in a separate module in this example is for explanation and not for limitation of the present invention. Authentication proxy (216) of FIG. 2 may, for example, be implemented as a module inside access manager (210), inside authentication manager (214), or inside any other module of identity provider (126) as will occur to those of skill in the art.

In the example of FIG. 2, service provider (128) includes access manager (230) and user registry (242). Access manager (230) of FIG. 2 includes session manager (232) and authentication manager (234). In the example of FIG. 2, access manager (230) of service provider (128), session manager (232) of service provider (128), authentication manager (234) of service provider (128), and user registry (242) of service provider (128) all have structure and operate in a manner similar to access manager (210) of identity provider (126), session manager (212) of identity provider (126), authentication manager (214) of identity provider (126), and user registry (242) of identity provider (126).

Service provider (128) of FIG. 2 also includes an identity manager (238). Identity manager (238) may be represented by a web service that performs single sign-on services for principal (132) authorized to participate in single sign-on by access manager (230). Identity manager (238) implements single sign-on services in identity provider (126) by exchanging security messages with identity provider (126) and principal (132). In the example of FIG. 2, identity manager (238) receives a request of the principal (132) for access to a resource (240) of the service provider (128) and determines whether an authentication credential of the request satisfies the service provider's authentication policy by accesses a principal's identity-related information from user registry (242). The identity manager (238) of FIG. 2 sends an authentication request specifying the service provider's authentication policy to an identity provider (126) if the principal's authentication credential of the request does not satisfy the service provider's authentication policy. Identity manager (238) also receives an authentication response from identity provider (126) that includes an authentication credential satisfying the service provider's authentication policy and records in the service provider's session data for the principal the authentication credential. An example of an identity manager that may be improved for authentication of a principal in a federation according to embodiments of the present invention is the IBM® Tivoli® Identity Manager. Other identity managers (218) as will occur to those of skill in the art also may be improved for authentication of a principal in a federation according to the present invention.

Authentication of a principal in a federation in accordance with embodiments of the present invention is generally implemented with computers, that is, with automated computing machinery. In the system of FIG. 1, for example, all the nodes, servers, and communications devices are implemented to some extent at least as computers. For further explanation, therefore, FIG. 3 sets forth a block diagram of automated computing machinery comprising an exemplary computer (152) useful in authentication of a principal in a federation according to embodiments of the present invention. The computer (152) of FIG. 3 includes at least one computer processor (156) or 'CPU' as well as random access memory (168) ('RAM') which is connected through a system bus (160) to processor (156) and to other components of the computer.

Stored in RAM (168) is an authentication proxy (216), computer program instructions for authenticating a principal by an identity provider according to a service provider's authentication policy and recording in session data of an identity provider an authentication credential satisfying a service provider's authentication policy. Also stored in RAM (168) is an access manager (210), computer program instructions for authenticating a principal by an identity provider according to an identity provider's authentication policy. Also stored in RAM (168) is an identity provider's identity manager (218), computer program instructions for receiving in the identity provider an authentication request from the service provider, the authentication request specifying the service provider's authentication policy. Also stored in RAM (168) is a service provider's identity manager (238), computer program instructions for receiving in the service provider a request of the principal for access to a resource of the service provider, determining by the service provider that an authentication credential of the request does not satisfy the service provider's authentication policy, sending by the service provider to the identity provider an authentication request specifying the service provider's authentication policy, receiving an authentication response by the service provider from the identity provider, the authentication response including the authentication credential satisfying the service provider's authentication policy, and recording in session data of the service provider the authentication credential.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), authentication proxy (216), access manager (210), identity provider's identity manager (218), and service provider's identity manager (238) in the example of FIG. 3 are shown in RAM (168), but many components of such software typically are stored in non-volatile memory (166) also.

Figure 3:
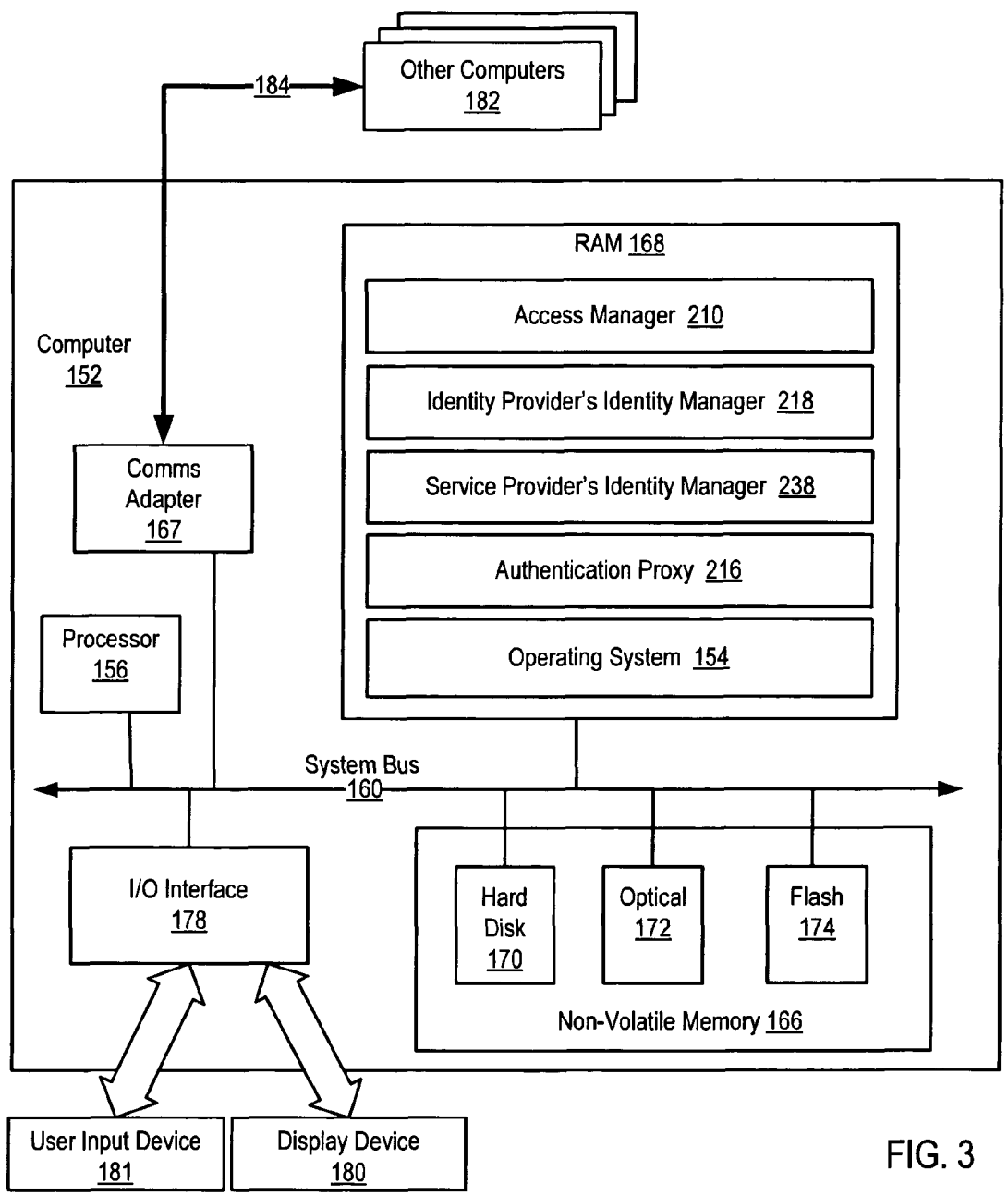
FIG. 3 sets forth a block diagram of automated computing machinery comprising an exemplary computer useful in authentication of a principal in a federation according to embodiments of the present invention.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
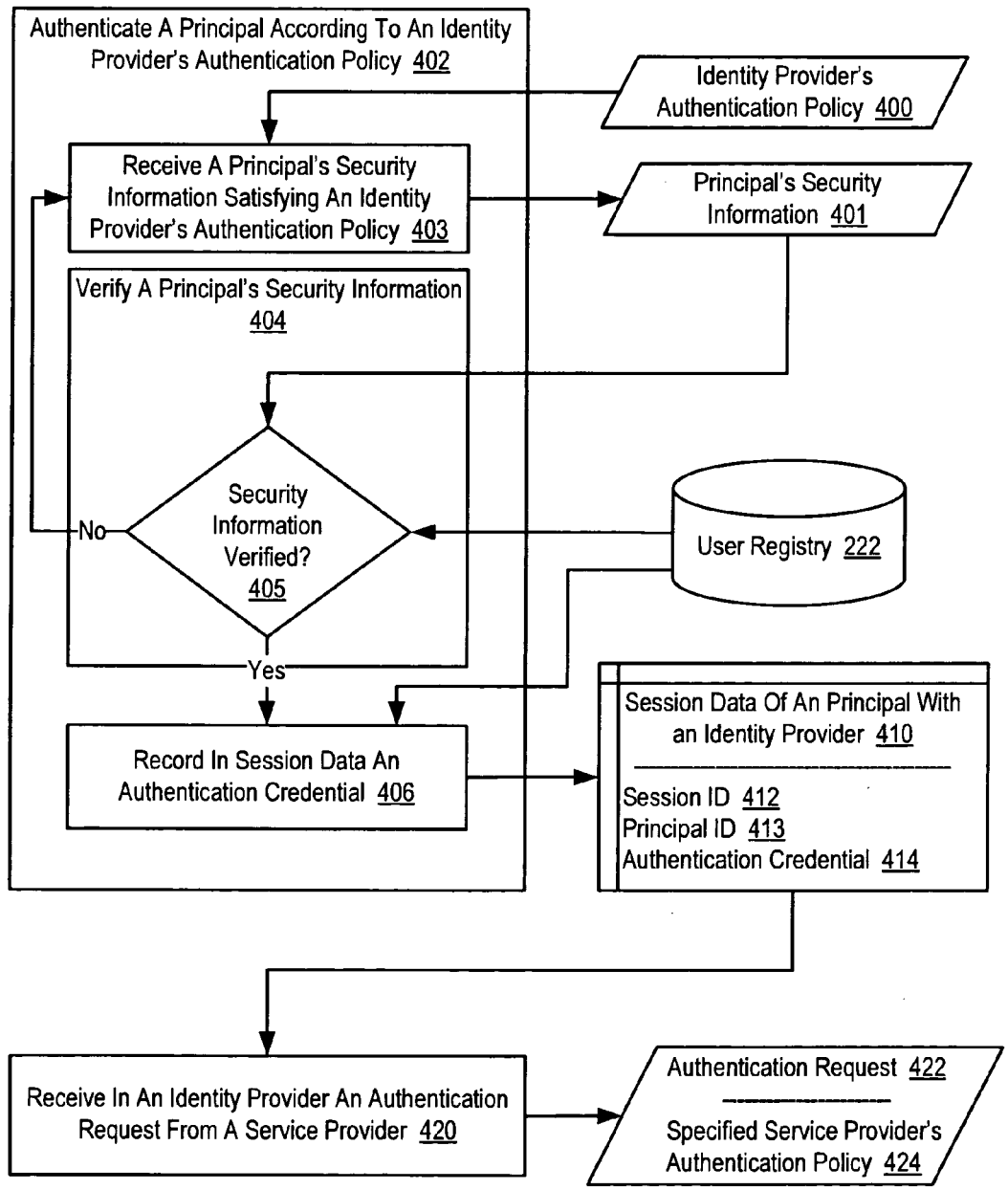
FIG. 4 sets forth a flow chart illustrating an exemplary method for authentication of a principal in a federation according to embodiments of the present invention.

For further explanation, FIG. 4 sets forth a flow chart illustrating an exemplary method for authentication of a principal in a federation according to embodiments of the present invention. The method of FIG. 4 implements a single sign-on authentication sequence based on a push-based protocol. Push-based single sign-on is an implementation of single sign-on authentication that redirects a principal having authenticated with an identity provider to a service provider when the principal accesses a service provider's resource through an identity provider's domain such as, for example, through a portal webpage of an identity provider. When a principal is a web service client, an identity provider may provide an authentication credential of the principal to a service provider by sending a web service message to the service provider through the principal using an HTTP 302 redirect. When a principal is a person using a web browser, an identity provider may provide an authentication credential of the principal to a service provider by including a pointer to a Security Association Markup Language ('SAML') assertion in an HTTP 302 redirect to a service provider. SAML is a standard of the Oasis Standards Organization. SAML consists of two distinct pieces of functionality, an assertion and a protocol. A SAML assertion is used to transfer information about a principal, while the SAML protocol is a means of exchanging a SAML assertion.

The method of FIG. 4 includes authenticating (402) a principal by an identity provider according to an identity provider's authentication policy and receiving (420) in an identity provider an authentication request from a service provider that specifies a service provider's authentication policy. The identity provider's authentication policy (400) in the example of FIG. 4 is a set of claims and related security information required by an identity provider to authenticate a principal requesting access to a resource or participating in single sign-on with an identity provider. An identity provider's authentication policy may require a principal to provide security information such as, for example, a username and password, a symmetric cryptographic key, an X.509 certification, a Kerberos ticket, or any other security related information as will occur to those of skill in the art. An identity provider uses security information provided by a principal to create authentication credentials that satisfy an identity provider's authentication policy.

In the method of FIG. 4, authenticating (402) a principal by an identity provider according to an identity provider's authentication policy (400) includes receiving (403) security information (401) from a principal according to an identity provider's authentication policy (400). When a principal is represented by a person or a thread or process representing a person, receiving (403) security information (401) from a principal satisfying an identity provider's authentication policy (400) according to the method of FIG. 4 may include an access manager's prompting a principal for security information (401) through a user interface such as, for example, a computer screen or speech synthesizer. When a principal is represented by a web service client, receiving (403) security information (401) according the method of FIG. 4 may also include an access manager's specifying an identity provider's authentication policy in a web service message such as, for example, an XML representation of the identity provider's authentication policy enclosed in a SOAP envelope and transmitting the web service message by an access manager to the principal using a network protocol such as, for example, HTTP.

In the method of FIG. 4, authenticating (402) a principal by an identity provider according to an identity provider's authentication policy (400) also includes verifying (404) security information (401) of a principal with identity-related information stored in user registry (222). User registry (222) is a database that stores identity-related information of a principal that may include, for example, a principal identifier, a principal name, email address, physical mailing address, office location, system preferences, security groups to which a principal belongs, security privileges, a principal's asymmetric public cryptographic key, a principal's symmetric cryptographic key, other identity-related information, and so on. Verifying (404) security information (401) may include, for example, hashing a password provided by a principal in an authentication sequence and comparing to the hashed password to a hash of the principal's password previously stored in the user registry (222). Verifying security information (401) may also include, for example, decrypting a message using a principal's asymmetric public cryptographic key stored in user registry (222) where the message was digitally signed using a principal's asymmetric private encryption key. If a principal's security information (401) is not verified, an access manager of a identity provider can return a HTTP 401 response indicating that access to the identity provider has been refused based on the principal's security information.

The method of FIG. 4 also includes recording (406) in session data (410) of an identity provider an authentication credential (414) satisfying the identity provider's authentication policy (400) if a principal's security information is verified. Recording (406) in session data (410) of an identity provider an authentication credential (414) may be carried out by creating an authentication credential (414) from identity-related data in user registry (222) such as, for example, a principal identifier, security groups to which the principal belongs, security attributes, and so on. Because the method of FIG. 4 implements an initial authentication sequence of a principal with an identity provider, no previous session existed for the principal with the identity provider.

Recording (406) in session data (410) of an identity provider an authentication credential (414) according to the method of FIG. 4 therefore may include creating a session of a principal with an identity provider. In the method of FIG. 4, recording (406) in session data (410) of an identity provider an authentication credential (414) may also include storing an authentication credential (401) in session data (410) of a principal with an identity provider. Session data of a principal with an identity provider is represented in this example as a data structure (410) that associates a session identifier (412) with a principal identifier (413) and an authentication credential (414) for the session. The authentication credential (414) represents a principal's security privileges for the duration of a session.

In a push-based single sign-on environment according to the method of FIG. 4, where authentication is carried out according to a service provider's authentication policy, a service provider may require different authentication credentials to authenticate a principal than the authentication credentials provided by the identity provider. Rather than prompting a principal for additional security information directly, a service provider requests authentication credentials from an identity provider satisfying the service provider's authentication policy.

The method of FIG. 4 also includes receiving (420) in an identity provider an authentication request (422) from a service provider that specifies the service provider's authentication policy (424). Receiving (420) in an identity provider an authentication request (422) from a service provider may be carried out by receiving an authentication request (422) in an identity manager of an identity provider at a web services endpoint described in a WSDL description of the identity manager. An authentication request (422) from a service provider that specifies the service provider's authentication policy (424) may be a web service message that includes an XML representation of the service provider's authentication policy placed in a SOAP envelope.

Figure 5:
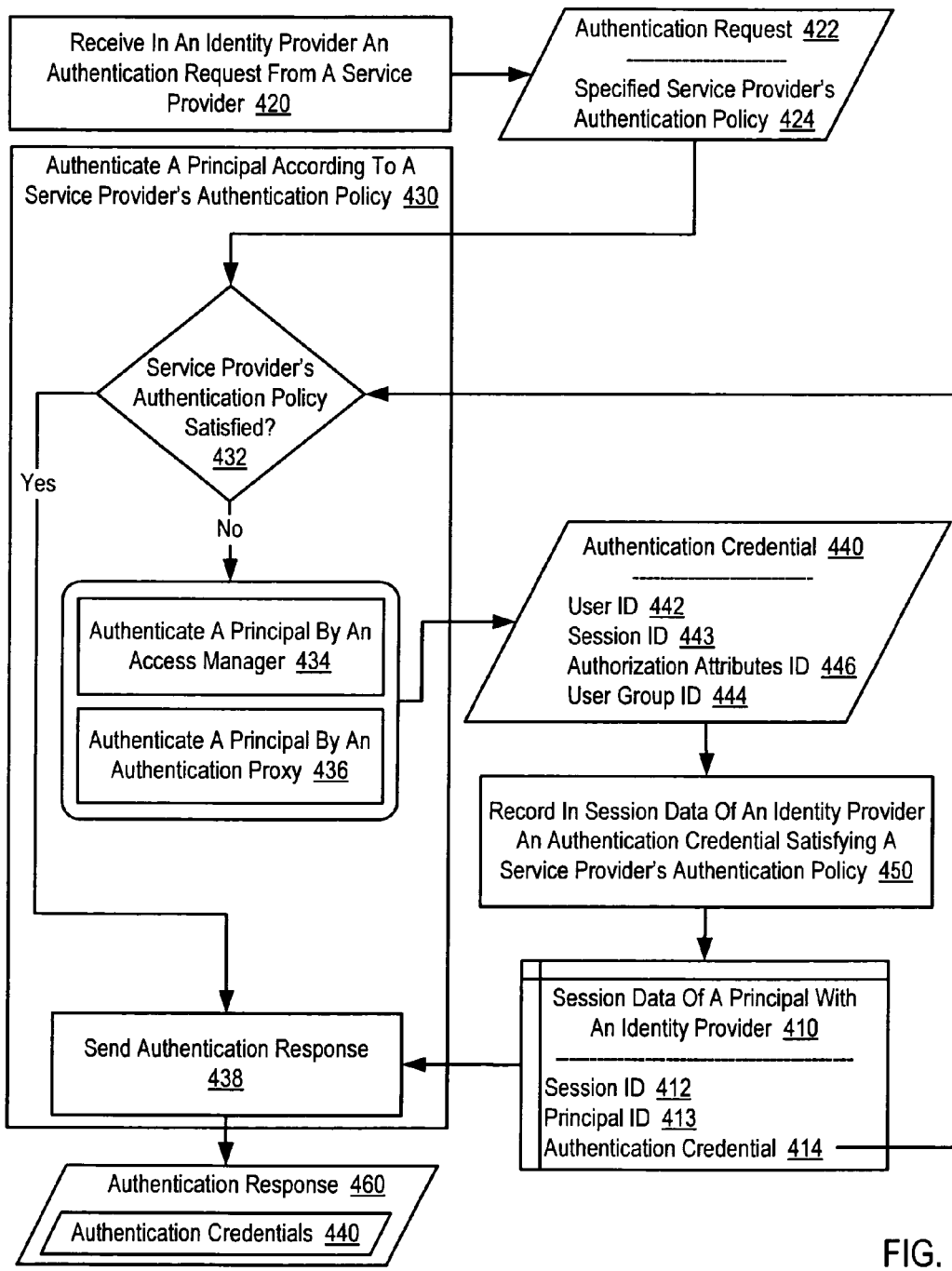
FIG. 5 sets forth a flow chart illustrating a further exemplary method for authentication of a principal in a federation according to embodiments of the present invention.

For further explanation, FIG. 5 sets forth a flow chart illustrating a further exemplary method for authentication of a principal in a federation according to embodiments of the present invention that includes receiving (420) in an identity provider an authentication request from a service provider that specifies the service provider's authentication policy, authenticating (430) a principal by an identity provider according to a service provider's authentication policy, and recording (450) in session data of the identity provider an authentication credential satisfying the service provider's authentication policy.

The method of FIG. 4 includes receiving (420) in an identity provider an authentication request (422) from a service provider that specifies the service provider's authentication policy (424). Receiving (420) in an identity provider an authentication request (422) from a service provider may be carried out by receiving an authentication request (422) in an identity manager of an identity provider at a web services endpoint described in a WSDL description of the identity manager. An authentication request (422) from a service provider that specifies the service provider's authentication policy (424) may be a web service message that includes an XML representation of the service provider's authentication policy placed in a SOAP envelope.

Receiving (420) in an identity provider an authentication request (422) from a service provider that specifies the service provider's authentication policy (424) according to the method of FIG. 5 may occur when a principal participates in push-based single sign-on as discussed above with reference to FIG. 4. Receiving (420) in an identity provider an authentication request (422) from a service provider that specifies the service provider's authentication policy (424) according to the method of FIG. 5 may also occur when a principal participates in pull-based single sign-on. Pull-based single sign-on is an implementation of single sign-on authentication that redirects a principal to an identity provider for single sign-on when the principal attempts to access a resource on a service provider directly, for example, by typing in the URL of the service provider or by using a bookmark in a web browser. That is, the principal does not access a service provider's resource through an identity provider such as, for example, through a webpage portal on a web server of the identity provider. In a pull-based single sign-on environment, a service provider will request authentication credentials from an identity provider when a principal requests access to a resource of the service provider. The request (422) of FIG. 5 specifies a service provider's authentication policy (424).

In the method of FIG. 5, authenticating (430) the principal by an identity provider according to a service provider's authentication policy may be carried out by determining (432) whether the service provider's authentication policy is satisfied by a current authentication credential (414) in session data (410) of a principal with an identity provider. Session data of a principal with an identity provider is represented in this example as a data structure (410) that associates a session identifier (412) with a principal identifier (413) and an authentication credential (414) for the session. The authentication credential (414) represents a principal's security privileges for the duration of a session. Whether the service provider's authentication policy is satisfied by a current authentication credential (414) in session data (410) of a principal with an identity provider may be determined by an identity provider's identity manager. Session data (410) may be obtained by an identity provider's identity manager from an identity provider's access manager.

If the service provider's authentication policy is satisfied by a current authentication credential (414) in session data (410) of a principal with an identity provider, authenticating (430) the principal by an identity provider according to a service provider's authentication policy according to the example of FIG. 5 includes sending (438) by an identity provider to a service provider an authentication response (460) that includes an authentication credential (440) satisfying the service provider's authentication policy. Sending (438) by an identity provider to a service provider an authentication response (460) according to the example of FIG. 5 may include reading an authentication credential (414) from session data (410) of a principal with an identity provider. Sending (438) by an identity provider to a service provider an authentication response (460) according to the example of FIG. 5 may include transmitting a web service message from an identity provider's identity manager to a service provider through a principal using an HTTP 302 redirect.

Authentication response (460) in the example of FIG. 5 includes authentication credentials (440) satisfying a service provider's authentication policy. Authentication response (460) may be represented by a XML-based web service message enclosed in a SOAP envelope. Authentication credential (440) in the example of FIG. 5 represents a principal's security privileges for the duration of a single sign-on session with an identity provider. Authentication credential (440) associates a user identifier (442) with a session identifier (443), a user group identifier (444), and authorization attributes identifier (446). Authentication credentials (440) of FIG. 5 may be represented by a security token such as, for example, those security tokens described in the web services specification entitled 'Web Services Security' ('WS-Security') developed by IBM, Microsoft, and VeriSign or the web services specification entitled 'Web Services Trust Language' ('WS-Trust') developed by IBM, Microsoft, VeriSign, OpenNetworks, Layer 7, Computer Associates, BEA, Oblix, Reactivity, RSA Security, Ping Identity, and Actional.

If the service provider's authentication policy is not satisfied by a current authentication credential (414) in session data (410) of a principal with an identity provider, authenticating (430) the principal by an identity provider according to a service provider's authentication policy according to the example of FIG. 5 includes either authenticating (434) a principal by an access manager of an identity provider or authenticating (436) a principal by an authentication proxy of an identity provider. In the method of FIG. 5, authenticating (436) a principal by an authentication proxy of an identity provider may be carried out by receiving security information satisfying a service provider's authentication policy. When a principal is a person or a thread or process representing a person, receiving (403) security information (401) from a principal satisfying an identity provider's authentication policy (400) according to the method of FIG. 4 may include an access manager's prompting a principal for security information (401) through a user interface such as, for example, a computer screen or speech synthesizer. When a principal is a web services client, receiving (403) security information (401) according the method of FIG. 4 may also include an access manager's specifying an identity provider's authentication policy in a web service message such as, for example, an XML representation of the identity provider's authentication policy enclosed in a SOAP envelope and transmitting the web service message by an access manager to the principal using a network protocol such as, for example, HTTP.

Authenticating (436) a principal by an authentication proxy of an identity provider according to the method of FIG. 5 may also be carried out by verifying security information of a principal with identity-related information stored in a user registry. Verifying security information may include, for example, hashing a password provided by a principal in an authentication sequence and comparing to the hashed password to a hash of the principal's password previously stored in a user registry. Verifying security information may also include, for example, decrypting a message using a principal's public asymmetric cryptographic key stored in a user registry where the message was digitally signed using a principal's private asymmetric encryption key.

Authenticating (434) a principal by an access manager of an identity provider according to the method of FIG. 5 operates in a manner similar to authenticating (436) a principal by an authentication proxy of an identity provider. In the method of FIG. 5, authenticating (434) a principal by an access manager of an identity provider may also be carried out by receiving security information satisfying a service provider's authentication policy and verifying security information of a principal with identity-related information stored in a user registry.

The method of FIG. 5 continues by recording (450) in session data (440) of an identity provider an authentication credential (440) satisfying a service provider's authentication policy if the service provider's authentication policy is not satisfied by a current authentication credential (414) in session data (410) of a principal with an identity provider. Because no previous session may have existed for the principal with the identity provider, the method of FIG. 5 may occur during an initial authentication sequence of a principal with an identity provider. Recording (450) in session data (440) of an identity provider an authentication credential (440) satisfying a service provider's authentication policy according to the method of FIG. 5 may therefore include creating a session of a principal with an identity provider. In the method of FIG. 5, recording (450) in session data (440) of an identity provider an authentication credential (440) satisfying a service provider's authentication policy may also include storing an authentication credential (440) in session data (410) of a principal with an identity provider as a current authentication credential (414). Session data of a principal with an identity provider is represented in this example as a data structure (410) that associates a session identifier (412) with a principal identifier (413) and an authentication credential (414) for the session. The authentication credential (414) represents a principal's security privileges for the duration of a session.

The method of FIG. 5 continues with authenticating (430) a principal by an identity provider according to a service provider's authentication policy by sending (438) by an identity provider to a service provider an authentication response (460) that includes an authentication credential (440) satisfying the service provider's authentication policy. Sending (438) by an identity provider to a service provider an authentication response (460) operates a similar manner as described above with reference to FIG. 5.

Figure 6:
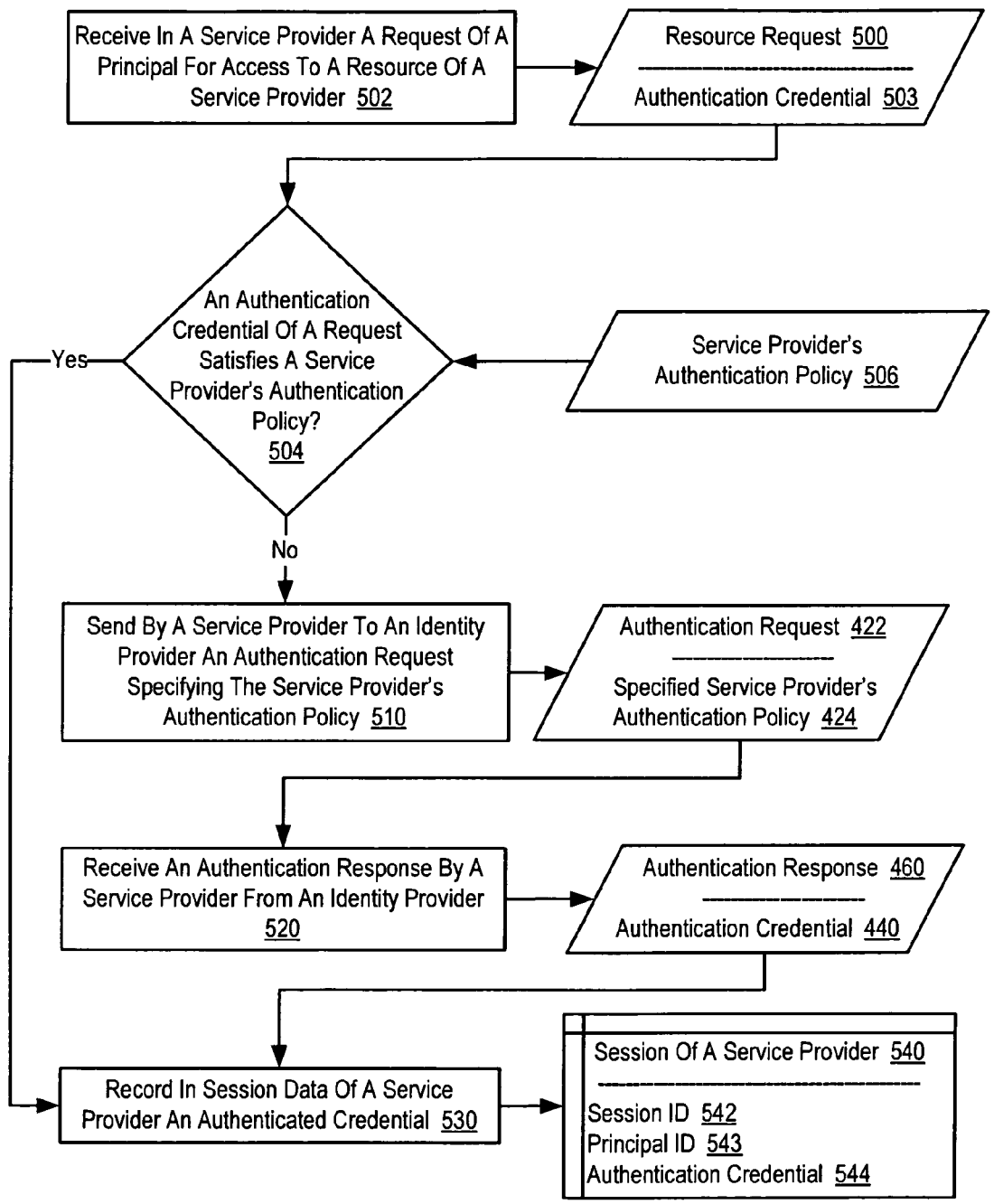
FIG. 6 sets forth a flow chart illustrating a further exemplary method for authentication of a principal in a federation according to embodiments of the present invention.

For further explanation, FIG. 6 sets forth a flow chart illustrating a further exemplary method for authentication of a principal in a federation according to embodiments of the present invention that includes receiving (502) in a service provider a request of a principal for access to a resource of the service provider, determining (504) by a service provider that an authentication credential of a request does not satisfy the service provider's authentication policy, sending by a service provider to an identity provider an authentication request specifying the service provider's authentication policy, receiving (520) an authentication response by a service provider from an identity provider, an authentication response including an authentication credential satisfying the service provider's authentication policy, and recording (530) in session data of a service provider a authentication credential.

The method of FIG. 6 includes receiving (502) in a service provider a request (500) of a principal for access to a resource of the service provider. When a principal is represented by a web service client, receiving (502) in a service provider a request (500) of a principal for access to a resource of the service provider according to the method of FIG. 6 may be carried out by receiving security information in a web service message to an access manager of a service provider at a web services endpoint described in a WSDL description of the access manager. When a principal is represented by a person operating a web browser, receiving (502) in a service provider a request (500) of a principal for access to a resource of the service provider according to the method of FIG. 6 may be carried out by prompting a principal for security information through a user interface such as, for example, a computer screen or speech synthesizer.

After receiving security information from either a web service client or a person operating a web browser, receiving (502) in a service provider a request (500) of a principal for access to a resource of the service provider according to the method of FIG. 6 may also be carried out by creating an authentication credential (503) from identity-related data in a user registry. Such identity-related data may include, for example, a principal identifier, security groups to which the principal belongs, security attributes, and the like. Receiving (502) in a service provider a request (500) of a principal for access to a resource of the service provider according to the method of FIG. 6 may further be carried out by an access manager's transmitting a principal's resource request (500) to an identity manager of the service provider, the request (500) including an authentication credential (503) of the principal.

A request (500) of a principal for access to a resource of the service provider in the example of FIG. 6 includes an authentication credential (503) of a principal. The resource request (500) may be represented by a XML-based web service message enclosed in a SOAP envelope. The authentication credential (503) represents a principal's security privileges for the duration of a principal's session with an identity provider. Authentication credentials (503) of FIG. 6 may be represented by a security token such as, for example, those security tokens described in the web services specification entitled 'WS-Security' and 'WS-Trust.'

The method of FIG. 6 includes determining (504) by a service provider that an authentication credential (503) of a request (500) does not satisfy a service provider's authentication policy (506). Determining (504) by a service provider that an authentication credential (503) of a request (500) does not satisfy a service provider's authentication policy (506) according to the method of FIG. 6 may be carried out by comparing a type of security information used in authenticating a principal as specified an authentication credential (503) of a request (500) with a the type of security information required by a service provider's authentication policy (506) as specified in a WSDL description of a web service. In the method of FIG. 6, whether an authentication credential (503) of a request (500) satisfies the service provider's authentication policy (506) may be determined by an identity manager in the service provider.

The service provider's authentication policy (506) in the example of FIG. 6 is a set of claims and related security information required by a service provider to authenticate a principal requesting access to a resource or participating in single sign-on with an identity provider. A service provider's authentication policy may require a principal to provide security information such as, for example, a username and password, a symmetric cryptographic key, an X.509 certification, a Kerberos ticket, or any other security related information as will occur to those of skill in the art. A service provider uses security information provided by a principal to create authentication credentials that satisfy a service provider's authentication policy.

The method of FIG. 6 includes sending (510) by the service provider to the identity provider an authentication request (422) specifying the service provider's authentication policy (424) if an authentication credential (503) of a request (500) does not satisfy a service provider's authentication policy (506). Sending (510) by the service provider to the identity provider an authentication request (422) specifying the service provider's authentication policy (424) according to the method of FIG. 6 may be carried out by creating a web service message in an identity manager of the service provider. Sending (510) by the service provider to the identity provider an authentication request (422) specifying the service provider's authentication policy (424) according to the method of FIG. 6 may further be carried out by transmitting a web service message from an identity provider's identity manager to a service provider through a principal using an HTTP 302 redirect.

Authentication request (422) in the example of FIG. 6 specifies a service provider's authentication policy (424). Authentication response (460) may be represented by a XML-based web service message enclosed in a SOAP envelope. A specified service provider's authentication policy (424) in the example of FIG. 6 is a set of claims and related security information required by a service provider to authenticate a principal requesting access to a resource or participating in single sign-on with an identity provider. A service provider's authentication policy may require a principal to provide security information such as, for example, a username and password, a symmetric cryptographic key, an X.509 certification, a Kerberos ticket, or any other security related information as will occur to those of skill in the art. A service provider uses security information provided by a principal to create authentication credentials that satisfy a service provider's authentication policy.

The method of FIG. 6 includes receiving (520) an authentication response (460) by a service provider from an identity provider, the authentication response including the authentication credential (440) satisfying the service provider's authentication policy (506) if an authentication credential (503) of a request (500) does not satisfy a service provider's authentication policy (506). Receiving (520) an authentication response (460) by a service provider from an identity provider may be carried out by receiving a web service message in an identity manager of a service provider at a web services endpoint described in a WSDL description of the identity manager.

Authentication response (460) in the example of FIG. 6 includes authentication credentials (440) satisfying a service provider's authentication policy. Authentication response (460) may be represented by a XML-based web service message enclosed in a SOAP envelope. Authentication credential (440) in the example of FIG. 6 represents a principal's security privileges for the duration of a single sign-on session with an identity provider. Authentication credentials (440) of FIG. 6 may be represented by a security token such as, for example, those security tokens described in the web services specification entitled 'WS-Security' or 'WS-Trust.'

The method of FIG. 6 includes recording (530) in session data (540) of the service provider the authentication credential (544). Because no previous session may have existed for the principal with the identity provider, the method of FIG. 6 may occur during an initial authentication sequence of a principal with a service provider. Recording (530) in session data (540) of the service provider the authentication credential (544) may therefore include creating a session of a principal with a service provider. In the method of FIG. 6, recording (530) in session data (540) of the service provider the authentication credential (544) may also include storing an authentication credential (544) in session data (540) of a principal with a service provider. Session data of a principal with a service provider is represented in this example as a data structure (540) that associates a session identifier (542) with a principal identifier (543) and an authentication credential (544) for the session. The authentication credential (544) represents a principal's security privileges for the duration of a session.

Figure 7A:
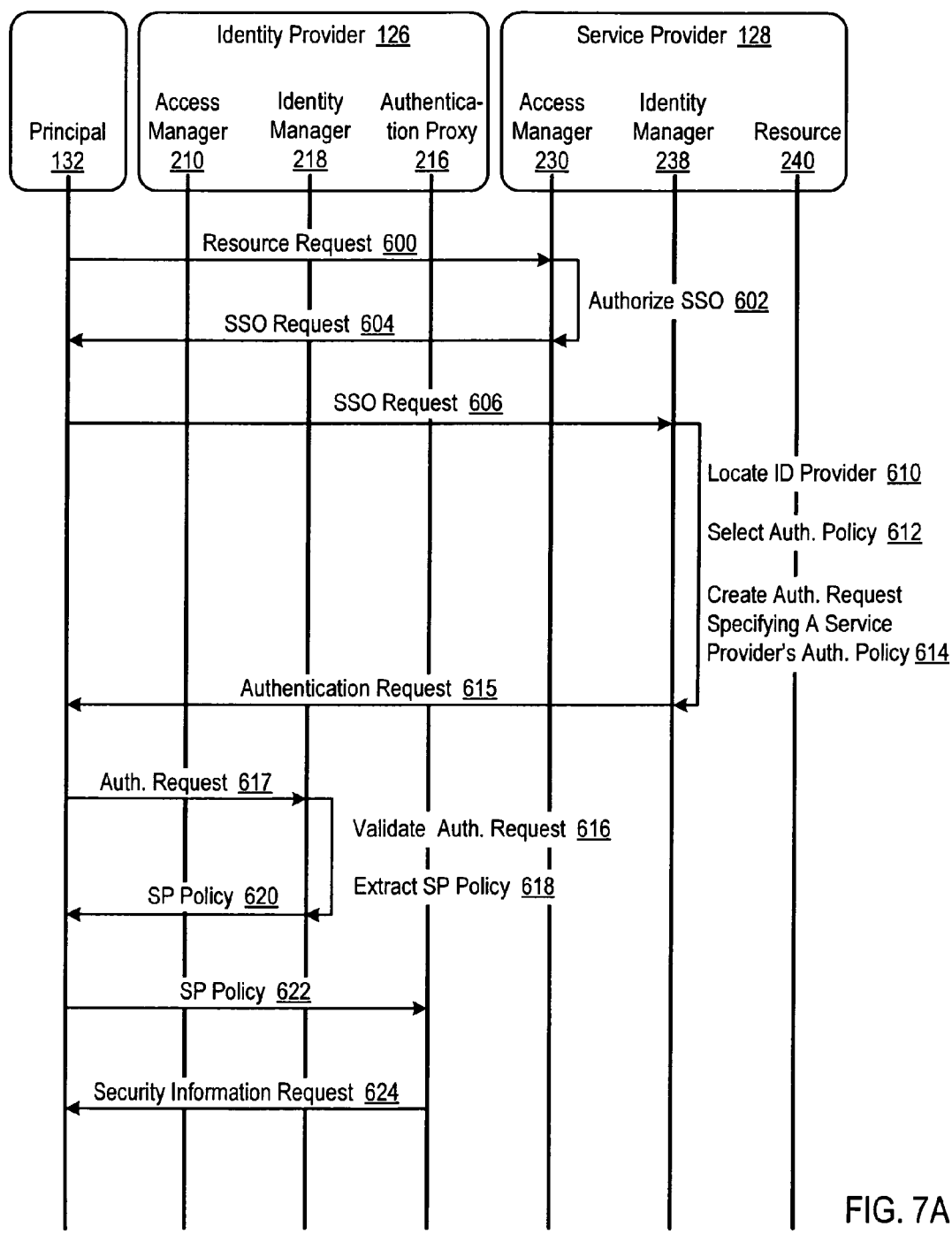
FIGS. 7A and 7B set for a calling sequence diagram illustrating an exemplary method for authenticating a principal in a federation according to embodiments of the present invention.
Figure 7B:
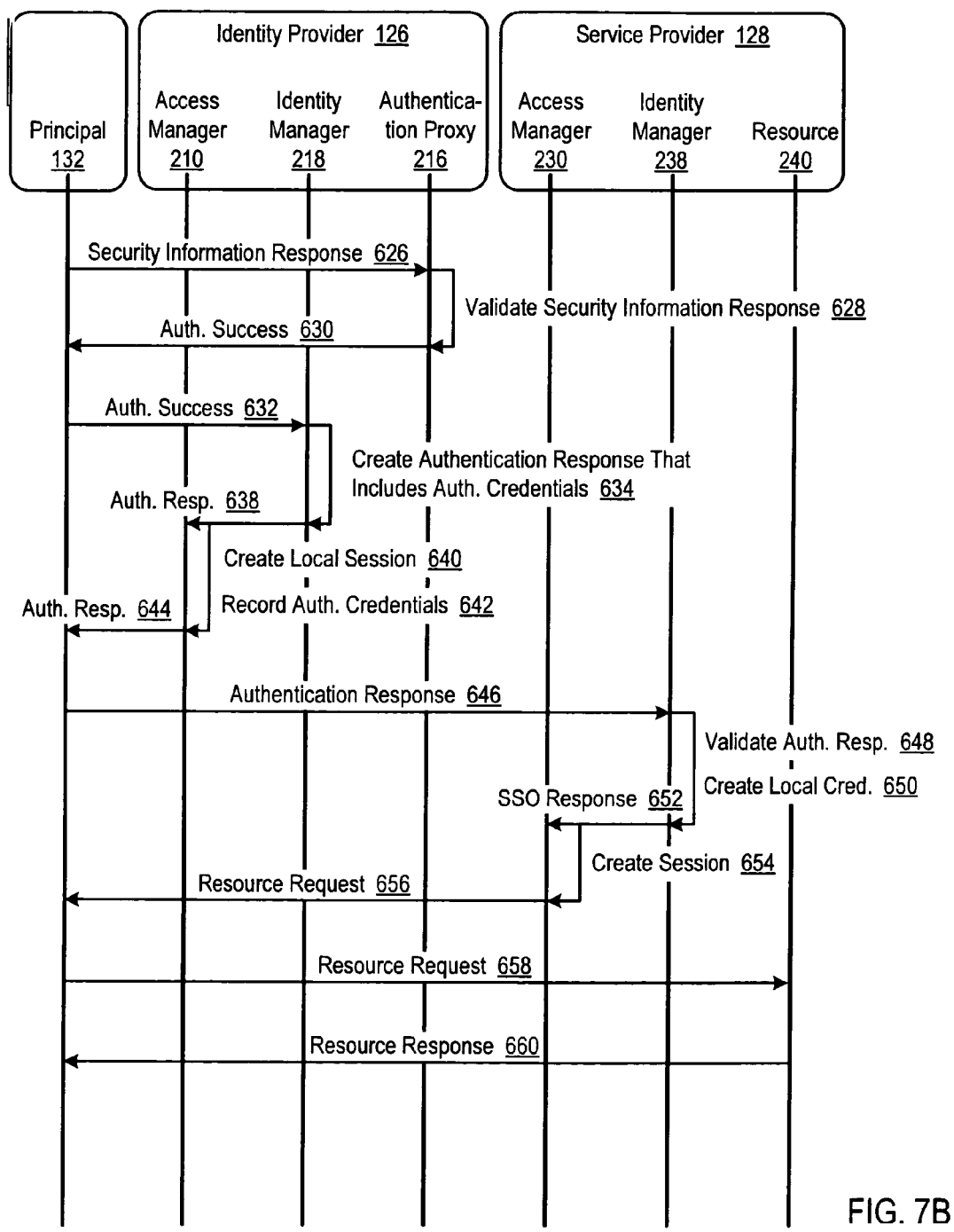

For further explanation, FIGS. 7A and 7B set forth a calling sequence diagram illustrating an exemplary method for authenticating a principal in a federation according to embodiments of the present invention. FIG. 7B is a continuation of the calling sequence diagram beginning in FIG. 7A. In the example of FIG. 7A, authenticating a principal in a federation according to embodiments of the present invention includes principal (132), identity provider (126), and service provider (128). The principal (132) in the example of FIG. 7A is represented as a person operating a web browser in a pull-based single sign-on environment. The identity provider (126) in the example of FIG. 7A includes access manager (210), identity manager (218), and authentication proxy (216). The service provider (128) in the example of FIG. 7A includes access manager (230), identity manager (238), and computer resource (240). Access manager (230) provides authorization services for resource (240).

In the example of FIG. 7A, principal (132) sends resource request (600) to access manager (230) of service provider (128). Resource request (600) is request to access resource (240). Resource request (600) according to the example of FIG. 7A may be represented by an HTTP request for a particular Uniform Resource Locator ('URL'). A URL is a standardized address name layout for resources such as, for example, documents or images. An HTTP request according to embodiments of the present invention may include, for example 'http://www.serviceprovider.com/resource.'

In the example of FIG. 7A, access manager (230) authorizes (602) a principal to participate in single sign-on. Not all principals may be authorized to participate in single sign-on with service provider (128). Access manager (230) according to the example of FIG. 7A therefore determines whether to authorize (602) a principal to participate in single sign-on based on identity-related information provided by the principal or accessed in a user registry. Consider, for example, an employee accessing a 401K at the website of an investment company where the employer acts as an identity provider. The investment company may issue the employee's employer a unique website for single sign-on of the employer's employees. An individual accessing the webpage of the investment company unique to the employer asserts that the individual is an employee authorized to participate in single sign-on.

In the method of FIG. 7A, access manager (230) sends single sign-on request (604) to principal (132). Single sign-on request (604) is a request by access manager (230) to an identity manager (238) to provide single sign-on services for principal (132). Single sign-on request (604) may be represented by an XML-based web service message containing identity-related information of principal (132).

Principal (132) in the example of FIG. 7A sends single sign-on request (606) to identity manager (238). Single sign-on request (606) is an HTTP 302 redirect of single sign-on request (604). An HTTP 302 redirect is an HTTP response with a status code of 302 that induces a web browser to temporarily go to another location to retrieve a web resource.

After receiving single sign-on request (606) in the example of FIG. 7A, identity manager (238) locates (610) an identity provider (126) to provide single sign-on for principal (132). The identity manager (238) may locate (610) an identity provider of a principal for the first time by prompting the principal (132) to select an identity provider (126) from a list. The service provider (128) may then store a cookie with the principal (132) to facilitate automatic selection of an identity provider (126). The identity manager (238) may also locate (610) a principal's identity provider by looking up the identity provider in a database containing identity providers that have established a relationship with service provider (128).

In the example of FIG. 7A, the identity manager (238) also selects (612) a service provider's authentication policy. Selecting (612) a service provider's authentication policy may be carried out by selecting an authentication policy based on the identity provider (126) providing authentication credentials for a principal. An identity manager of a service provider may require different authentication policies for different identity providers because a service provider may trust some identity providers more than other identity providers. The identity manager (238) may obtain an authentication policy required for a particular service provider from a database containing identity providers that have established a relationship with service provider (128).

A service provider's authentication policy is a set of claims and related security information required by a service provider to authenticate a principal requesting access to a resource or participating in single sign-on with an identity provider. A service provider's authentication policy may require a principal to provide security information such as, for example, a username and password, a symmetric cryptographic key, an X.509 certification, a Kerberos ticket, or any other security related information as will occur to those of skill in the art. A service provider uses security information provided by a principal to create authentication credentials that satisfy a service provider's authentication policy.

In the method of FIG. 7A, the identity manager (238) creates (614) an authentication request specifying a service provider's authentication policy. Creating (614) an authentication request specifying a service provider's authentication policy according to the example of FIG. 7A may include encoding an XML representation of the service provider's authentication policy in a web service message according to the web services specification entitled 'Web Services Policy Framework' ('WS-Policy') jointly authored by VeriSign, Microsoft, Sonic Software, IBM, and SAP or the web services specification entitled 'Web Services Security Policy Language' ('WS-SecurityPolicy') jointly authored by Microsoft, VeriSign, IBM, and RSA Security.

Identity manager (238) in the example of FIG. 7A sends authentication request (615) to principal (132). Authentication request (615) specifies a service provider's authentication policy. Principal (132) sends authentication request (617) to identity manager (218). Authentication request (617) in the example of FIG. 7A is an HTTP 302 redirect of authentication request (615). Each authentication request (615, 617) may be represented by an XML-based web service message enclosed in a SOAP envelope.

After receiving authentication request (617) in the method of FIG. 7A, identity manager (218) validates (616) an authentication request and extracts (618) a service provider's authentication policy. Validating (616) an authentication request may be implemented by verifying that a digital signature of the authentication request is the digital signature of identity manager (238) of service provider (128). Identity manager (218) may verify a digital signature of an authentication request by decrypting the signature using the public asymmetric encryption key of identity manager (238). A service provider's authentication policy may be extracted according to the example of FIG. 7A by reading an XML representation of the authentication policy from a web service message.

In the example of FIG. 7A, identity manager (218) transmits service provider's authentication policy (620) to a principal (132). Principal (132) sends service provider's authentication policy (622) to authentication proxy (216). The service provider's authentication policy (622) is an HTTP 302 redirection of a service provider's authentication policy (620). Service provider's authentication policy (620 and 622) may be represented by a web service message with an XML representation of the authentication policy enclosed in a SOAP envelope.

In the method of FIG. 7A, authentication proxy (216) sends a request (624) for security information to principal (132). The request (624) for security information may be represented by a prompt for a person operating a web browser to provide additional security information not previously provided in a single sign-on environment. Security information requested may include, for example, a username, a password, a social security number, a Kerberos ticket, an X.509 certification, and so on.

Now with reference to FIG. 7B: Principal (132) sends security information response (626) to authentication proxy (216). The security information response (626) may be sent using a secure connection between principal (132) and authentication proxy (216) such as, for example, the Secure Socket Layer ('SSL') protocol or the Transport Layer Security ('TLS') protocol.

In the example of FIG. 7B, authentication proxy (216) validates (628) a security information response (626). Validation (628) may occur by comparing the security information provided by principal (132) with identity-related data stored in a user registry. For example, a principal may be validated if a hashed version of a password provided to the authentication proxy matches a hashed version of the principal's password previously stored in a user registry.

Authentication proxy (216) in the method of FIG. 7B sends an authentication success response (630) to principal (132). The authentication success response (630) indicates that the authentication proxy (216) validated the security information provided by principal (132). Principal (132) sends authentication success response (630) to identity manager (218). Authentication success response (632) is an HTTP 302 redirect of authentication success response (630). Authentication success response (630 and 632) in the example of FIG. 7B may be represented by a web service message containing the identity of the principal and security-related information.

In the method of FIG. 7B, identity manager (218) creates (634) an authentication response (638) that includes authentication credentials. Creating (634) authentication response (638) may occur by embedding authentication credentials in a web service message. Authentication credentials may be created based on the security information provided by a principal and identity-related information stored in a user registry such as, for example, a principal identifier, a principal's authorization attributes, groups to which a principal belongs, the type of security information used to authenticate a user, and so on.

Identity manager (218) in the example of FIG. 7B transmits authentication response (638) to access manager (210). The authentication response (638) may be represented by an XML-based web service message. Authentication credentials may be implemented in authentication response (638) as a security token such as, for example, those security tokens described in the web services specification entitled 'WS-Security' and 'WS-Trust' and enclosed in a SOAP envelope. In the example of FIG. 7B, identity manager (218) sends authentication response (638) to access manager (210) of identity provider (126).

In the method of FIG. 7B, access manager (210) creates (640) a local session of the principal (132) with the identity provider (126) and records (642) authentication credentials of the authentication response (638) in the session data of the principal (132) with the identity provider (126).

Access manager (210) in the example of FIG. 7B sends authentication response (644) to principal (132). Authentication response (644) is a forward of authentication response (638) from identity manager (218) to access manager (210). Principal (132) sends authentication response (646) to identity manager (238) in the method of FIG. 7B. Authentication response (646) of FIG. 7B is an HTTP 302 redirect of authentication response (644).

In the example of FIG. 7B, identity manager (238) validates (648) authentication response (646). Validating (648) an authentication response may be implemented by verifying that a digital signature of the authentication request is the digital signature of identity manager (218), the originator of the authentication response. Identity manager (238) may verify a digital signature of an authentication request by decrypting the signature using the public asymmetric encryption key of identity manager (218).

In the method of FIG. 7B, identity manager (238) creates (650) local authentication credentials that define a principal's privileges during the principal's session with a service provider (128). Identity manager (238) creates (650) local authentication credentials based on the authentication credentials included in the authentication response (646). The identity manager (238) extracts the authentication credentials of the response (646) by reading the XML-representations of the authentication credentials enclosed in a SOAP envelope.

In the example of FIG. 7B, identity manager (238) sends a single sign-on response (652) to access manager (230) in response to single sign-on request (606) of FIG. 7A. Single sign on response (652) may be represented by an XML-based web service message. Single sign-on response (652) in the example of FIG. 7B includes local authentication credentials (652) such as, for example, a principal name, security attributes, the type of security information used to authenticate a principal, and so on.

The access manager (230) in the example of FIG. 7B creates (654) a session of principal (132) with service provider (128). Principal's (132) session with service provider (128) is represented as a data structure in service provider (128). The access manager (230) stores local authentication credentials in session data of principal (132) with service provider (128). Access manager (230) authorizes principal (132) to access resource (240) based on the local authentication credentials stored in session data.

In the method of FIG. 7B, access manager (230) sends resource request (656) to principal (132). Resource request (656) is a copy of the resource request (600) intercepted by access manager (230) in FIG. 7A for single sign-on processing. Principal (132) sends resource request (658) to resource (240). Resource request (658) is an HTTP 302 redirect of resource request (656) from principal (132) to resource (240).

Resource (240) in the example of FIG. 7B responds to resource request (658) by sending resource response (660) to principal (132). Resource response (660) is the response paired with a principal's resource request (600) of FIG. 7A. In the call sequence of FIGS. 7A and 7B, a principal is represented by a person operating a web browser. Resource response (660) may therefore be represented by static or dynamic web content using HTML, JSP, CGI scripts, and so on. Implementing a principal in the call sequence of FIGS. 7A and 7B is for explanation and not for limitation. A principal (132) according to the call sequence of FIGS. 7A and 7B may be represented by a web service. In such a case, resource response (660) may also be represented by the result of data processing provided by programs, processes, or threads of execution.

Exemplary embodiments of the present invention are described largely in the context of a fully functional computer system for authentication of a principal in a federation. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of authentication of a principal in a federation, the method implemented by an identity provider, the identity provider comprising a module of automated computing machinery that includes a computer processor and a computer memory operatively coupled to the computer processor, the method comprising:

receiving, at the identity provider, an authentication request specifying a service provider's authentication policy, the authentication request having been generated at the service provider in response to receipt at the service provider of a request of the principal for access to a resource of the service provider and a determination by the service provider that an authentication credential of the request does not satisfy the service provider's authentication policy;

authenticating the principal by the identity provider according to the service provider's authentication policy;

recording in session data of the identity provider an authentication credential satisfying the service provider's authentication policy; and sending an authentication response from the identity provider to the service provider, the authentication response including the authentication credential satisfying the service provider's authentication policy, the authentication credential adapted to be recordable in session data of the service provider.

2. The method of claim 1 further comprises authenticating the principal by the identity provider according to an identity provider's authentication policy.

3. The method of claim 1 wherein authenticating the principal further comprises authenticating the principal by an access manager of the identity provider.

4. The method of claim 1 wherein authenticating the principal further comprises authenticating the principal by an authentication proxy of the identity provider.

5. The method of claim 1 wherein the principal is represented as a web service described in a Web Services Description Language (WSDL) document and the receiving occurs at a web services endpoint described in the document.

6. A system for authentication of a principal in a federation, the system comprising an identity provider including a computer processor and a computer memory operatively coupled to the computer processor, the computer memory having disposed within it computer program instructions capable of:

receiving, at the identity provider, an authentication request specifying a service provider's authentication policy, the authentication request having been generated at the service provider in response to receipt at the service provider of a request of the principal for access to a resource of the service provider and a determination by the service provider that an authentication credential of the request does not satisfy the service provider's authentication policy;

authenticating the principal by the identity provider according to the service provider's authentication policy;

recording in session data of the identity provider an authentication credential satisfying the service provider's authentication policy; and sending an authentication response from the identity provider to the service provider, the authentication response including the authentication credential satisfying the service provider's authentication policy, the authentication credential adapted to be recordable in session data of the service provider.

7. The system of claim 6 wherein the principal is represented as a web service described in a Web Services Description Language (WSDL) document and the receiving occurs at a web services endpoint described in the document.

8. A computer program product for authentication of a principal in a federation, the computer program product including computer program instructions disposed upon a non-transitory computer readable storage medium, the computer program instructions, when executed in an identity provider, capable of:

receiving, at the identity provider, an authentication request specifying a service provider's authentication policy, the authentication request having been generated at the service provider in response to receipt at the service provider of a request of the principal for access to a resource of the service provider and a determination by the service provider that an authentication credential of the request does not satisfy the service provider's authentication policy;

authenticating the principal by the identity provider according to the service provider's authentication policy;

recording in session data of the identity provider an authentication credential satisfying the service provider's authentication policy; and sending an authentication response from the identity provider to the service provider, the authentication response including the authentication credential satisfying the service provider's authentication policy, the authentication credential adapted to be recordable in session data of the service provider.

9. The computer program product of claim 8 further comprising computer program instructions capable of authenticating the principal by the identity provider according to an identity provider's authentication policy.

10. The computer program product of claim 8 wherein authenticating the principal further comprises authenticating the principal by an access manager of the identity provider.

11. The computer program product of claim 8 wherein authenticating the principal further comprises authenticating the principal by an authentication proxy of the identity provider.

12. The computer program product of claim 8 wherein the principal is represented as a web service described in a Web Services Description Language (WSDL) document and the receiving occurs at a web services endpoint described in the document.

* * * * *